(12) United States Patent
Lv et al.

(10) Patent No.: US 12,543,790 B2
(45) Date of Patent: Feb. 10, 2026

(54) ATOMIZATION COMPONENT, ATOMIZER, AND ELECTRONIC ATOMIZATION DEVICE

(71) Applicant: SHENZHEN SMOORE TECHNOLOGY LIMITED, Guangdong (CN)

(72) Inventors: Hongxia Lv, Shenzhen (CN); Zhenlong Jiang, Shenzhen (CN); Pei Li, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 542 days.

(21) Appl. No.: 17/814,035

(22) Filed: Jul. 21, 2022

(65) Prior Publication Data

US 2023/0050630 A1 Feb. 16, 2023

(30) Foreign Application Priority Data

Aug. 13, 2021 (CN) .......................... 202110931780.1

(51) Int. Cl.
*A24F 40/46* (2020.01)
*A24F 40/10* (2020.01)
(Continued)

(52) U.S. Cl.
CPC ............. *A24F 40/46* (2020.01); *A24F 40/10* (2020.01); *B32B 15/04* (2013.01); *B32B 17/06* (2013.01);
(Continued)

(58) Field of Classification Search
None
See application file for complete search history.

(56) References Cited

U.S. PATENT DOCUMENTS

| | | | | | |
|---|---|---|---|---|---|
| 3,973,103 | A | * | 8/1976 | Tadewald | H05B 3/283 392/435 |
| 4,032,751 | A | * | 6/1977 | Youtsey | H05B 3/146 338/211 |

(Continued)

FOREIGN PATENT DOCUMENTS

| | | |
|---|---|---|
| CN | 100376857 C | 3/2008 |
| CN | 106579564 A | 4/2017 |

(Continued)

OTHER PUBLICATIONS

European Patent Office, Search Report in European Patent Application No. 22190231.5 (Dec. 14, 2022).

(Continued)

*Primary Examiner* — Thor S Campbell
(74) *Attorney, Agent, or Firm* — Leydig, Voit & Mayer, Ltd.

(57) ABSTRACT

An atomization component includes: a matrix; and a heating film. The matrix includes an atomization surface. The heating film is arranged on the atomization surface, and when energized, heats and atomizes an aerosol-generating substrate on the atomization surface. The heating film includes a metal heating layer and an inorganic protection layer that are stacked, the inorganic protection layer being arranged on a surface of the metal heating layer that is away from the matrix. The metal heating layer includes at least two sub-metal layers that are sequentially stacked. Any two adjacent sub-metal layers have different components.

17 Claims, 7 Drawing Sheets

(51) Int. Cl.
  *B32B 15/04* (2006.01)
  *B32B 17/06* (2006.01)
  *B32B 18/00* (2006.01)
  *B32B 27/06* (2006.01)
  *H05B 3/12* (2006.01)
  *H05B 3/18* (2006.01)
  *A61M 11/04* (2006.01)
  *B32B 15/00* (2006.01)
  *B32B 17/00* (2006.01)
  *B32B 27/00* (2006.01)

(52) U.S. Cl.
  CPC .............. *B32B 18/00* (2013.01); *B32B 27/06* (2013.01); *H05B 3/12* (2013.01); *H05B 3/18* (2013.01); *A61M 11/042* (2014.02); *B32B 15/00* (2013.01); *B32B 17/00* (2013.01); *B32B 27/00* (2013.01); *B32B 2255/00* (2013.01); *B32B 2255/205* (2013.01); *B32B 2255/28* (2013.01); *B32B 2457/00* (2013.01); *H05B 2203/013* (2013.01); *H05B 2203/016* (2013.01); *H05B 2203/021* (2013.01)

(56) References Cited

U.S. PATENT DOCUMENTS

| | | | |
|---|---|---|---|
| 5,780,820 A * | 7/1998 | Komyoji | H05B 3/34 219/217 |
| 6,085,026 A * | 7/2000 | Hammons | A61L 9/03 219/544 |
| 11,744,964 B2 * | 9/2023 | Fraser | A61M 15/06 392/386 |
| 2014/0314396 A1 * | 10/2014 | Hsu | F24H 3/002 392/376 |
| 2015/0164143 A1 * | 6/2015 | Maas | H05B 3/0014 392/395 |
| 2016/0021930 A1 * | 1/2016 | Minskoff | A24F 40/51 392/395 |
| 2017/0164657 A1 | 6/2017 | Batista | |
| 2017/0231277 A1 * | 8/2017 | Mironov | A24F 40/40 392/404 |
| 2023/0126886 A1 * | 4/2023 | Batista | F22B 1/284 392/395 |
| 2023/0180847 A1 * | 6/2023 | Mironov | A24F 40/50 392/386 |

FOREIGN PATENT DOCUMENTS

| | | | | |
|---|---|---|---|---|
| CN | 106659247 | A | | 5/2017 |
| CN | 110419779 | A | | 11/2019 |
| CN | 110447959 | A | | 11/2019 |
| CN | 110720675 | A | | 1/2020 |
| CN | 210329343 | U | | 4/2020 |
| CN | 111387555 | A | | 7/2020 |
| CN | 216453382 | U | | 5/2022 |
| WO | 2020177131 | A1 | | 9/2020 |
| WO | WO-2020238607 | A1 | * | 12/2020 |
| WO | WO-2023045583 | A1 | * | 3/2023 |
| WO | WO-2024098752 | A1 | * | 5/2024 |
| WO | WO-2024200677 | A1 | * | 10/2024 ............. A24F 40/42 |

OTHER PUBLICATIONS

Chinese Patent Office, First Office Action in Chinese Patent Application No. 202121906692.8 (Dec. 31, 2021).

Chinese Patent Office, Office Action in Chinese Patent Application No. 202110931780.1 (Aug. 19, 2024).

* cited by examiner

Sequentially and alternately form a first sub-metal layer and a second sub-metal layer on an atomization surface of a matrix by magnetron sputtering according to a preset quantity of layers ~ S31

Form an inorganic layer on a surface of a metal heating layer that faces away from the matrix to prepare a heating film on the matrix ~ S32

FIG. 14

Form a metal heating layer on a matrix ~ S41

Form an inorganic layer on a surface of the metal heating layer that faces away from the matrix to prepare a heating film on the matrix ~ S42

Perform patterning processing on the heating film according to a preset pattern ~ S43

FIG. 15

ATOMIZATION COMPONENT, ATOMIZER, AND ELECTRONIC ATOMIZATION DEVICE

CROSS-REFERENCE TO PRIOR APPLICATION

Priority is claimed to Chinese Patent Application No. CN 202110931780.1, filed on Aug. 13, 2021, the entire disclosure of which is hereby incorporated by reference herein.

FIELD

The present invention relates to the technical field of electronic atomization devices, and in particular, to an atomization component, an atomizer, and an electronic atomization device.

BACKGROUND

An electronic atomization device is a device that can heat an aerosol-generating substrate to generate an aerosol. An atomization component of the electronic atomization device usually includes a ceramic matrix and a metal film arranged on an atomization surface of the ceramic matrix. After being energized, the metal film heats an aerosol-generating substrate close to the atomization surface.

The metal film is prone to oxidation failure during the sintering and atomization, especially when oil supply is insufficient during the atomization. As a result, the stability and service life of the electronic atomization device are severely affected. Therefore, a heating metal film including a precious metal material is used in an existing atomization component, and the precious metal accounts for a relatively high proportion in the heating metal film. The precious metal is usually a material such as gold, platinum, or the like. However, when the oil supply is insufficient, the heating metal film with a high proportion of precious metal is prone to over-burning, and precious metal particles in the heating metal film are prone to agglomeration, which in turn leads to a failure of the metal film, and reduces the stability and service life of the atomization component. In addition, the cost of the precious metal is relatively high. As a result, the cost of the atomization component is relatively high.

SUMMARY

In an embodiment, the present invention provides an atomization component, comprising: a matrix; and a heating film, wherein the matrix comprises an atomization surface, wherein the heating film is arranged on the atomization surface, and when energized, is configured to heat and atomize an aerosol-generating substrate on the atomization surface, wherein the heating film comprises a metal heating layer and an inorganic protection layer that are stacked, the inorganic protection layer being arranged on a surface of the metal heating layer that is away from the matrix, wherein the metal heating layer comprises at least two sub-metal layers that are sequentially stacked, and wherein any two adjacent sub-metal layers have different components.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 14 is a flowchart of a preparation method for an atomization component according to a third embodiment of this application; and FIG. 15 is a flowchart of a preparation method for an atomization component according to a fourth embodiment of this application.

DETAILED DESCRIPTION

Figure 1:
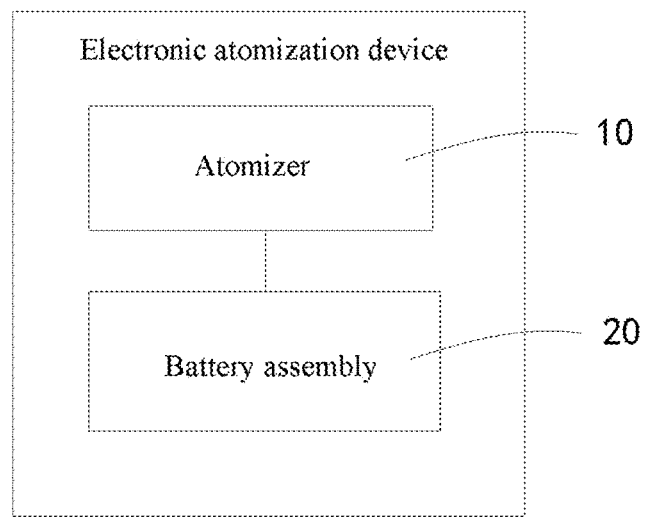
FIG. 1 is a schematic structural diagram of an electronic atomization device according to this application.

In an embodiment, the present invention provides an atomization component, an atomizer, and an electronic atomization device. The atomization component can resolve problems of poor stability and short service life of the atomization component.

In an embodiment, the present invention provides an atomization component, including a matrix and a heating film, where the matrix includes an atomization surface; the heating film is arranged on the atomization surface, and when energized, is capable of heating and atomizing an aerosol-generating substrate on the atomization surface; and the heating film includes a metal heating layer and an inorganic protection layer that are stacked, where the inorganic protection layer is arranged on a surface of the metal heating layer that is away from the matrix;

the metal heating layer includes at least two sub-metal layers that are sequentially stacked; and any two adjacent sub-metal layers have different components.

The matrix is a porous matrix; or the metal heating layer and/or the inorganic protection layer are porous structures.

The inorganic protection layer includes at least one of a ceramic material or a glass material. The inorganic protection layer has lipophilicity and/or hydrophilicity.

The metal heating layer includes a first sub-metal layer and a second sub-metal layer that are stacked, where the first sub-metal layer is made of NiCr or 316L stainless steel, and the second sub-metal layer is made of TiZr.

The metal heating layer comes into contact with the matrix through the second sub-metal layer.

There are at least two first sub-metal layers and at least two second sub-metal layers.

A total thickness of the first sub-metal layer is 1 µm to 20 µm, a total thickness of the second sub-metal layer is 0.5 µm to 5 µm, and a thickness of the inorganic protection layer is 0.1 µm to 5 µm.

A shape of the heating film or the metal heating layer is an S shape, a circle, an ellipse, a semicircle or a ring.

The atomization component further includes two electrodes, respectively arranged on two opposite sides of the metal heating layer and electrically connected to the metal heating layer; and the inorganic protection layer covers a portion of the metal heating layer that is located between the two electrodes.

The heating film is a rectangle, the two electrodes are arranged on two opposite sides of the rectangle, and a hollowed-out portion that does not generate heat is provided in the rectangular heating film.

The hollowed-out portion includes a first hollowed-out portion and a second hollowed-out portion, the first hollowed-out portion is located in the other opposite sides of the rectangle, and the first hollowed-out portion is a sector; and the second hollowed-out portion is located in the middle of the heating film, and the second hollowed-out portion is an ellipse or a circle.

The atomization surface of the porous matrix is further provided with a modification layer; and a thickness of the modification layer is 50 µm to 300 µm.

The modification layer includes the following components in parts by mass: 56 to 67.5 parts of silicon dioxide, 12 to 18 parts of aluminum oxide, and 2.8 to 5.5 parts of lithium oxide.

To resolve the technical problem, a second technical solution provided in this application is to provide an atomizer, including a liquid storage device and an atomization component, where the liquid storage device is configured to store an aerosol-generating substrate, and the atomization component is the atomization component in any of the above.

To resolve the technical problem, a third technical solution provided in this application is to provide an electronic atomization device, including a battery assembly and an atomizer, where the battery assembly is configured to supply power to the atomizer, and the atomizer is the atomizer in any of the above.

The present invention provides an atomization component, an atomizer, and an electronic atomization device. The atomization component is provided with a heating film, and the heating film is arranged on a matrix, so that the heating film generates heat when energized, and an aerosol-generating substrate on the atomization surface of the matrix is atomized to form an aerosol. The heating film includes a metal heating layer and an inorganic protection layer that are stacked. The metal heating layer includes at least two sub-metal layers that are sequentially stacked, and any two adjacent sub-metal layers have different components. Different components are arranged in any two adjacent sub-metal layers, so that an internal stress of the metal heating layer can be reduced. On the one hand, the continuity of a film layer of the metal heating layer can be improved, and cracks on the metal heating layer can be avoided; and on the other hand, the risk of crack failure generated by the heating film under thermal shock is also reduced.

In addition, the inorganic protection layer is arranged on the surface of the metal heating layer that is away from the matrix, so that the inorganic protection layer can protect the metal heating layer, and the production cost of the atomization component can be reduced due to the low cost of an inorganic material; and because inorganic material particles are not prone to over-burning and agglomeration under the condition of insufficient oil supply, the metal heating layer is not prone to failure, so that the stability of the atomization component is effectively improved and the service life of the atomization component is prolonged.

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

In the following descriptions, to illustrate rather than limit, specific details such as a particular system structure, an interface, and a technology are provided to make a thorough understanding of this application.

In the present invention, the terms “first”, “second”, and “third” are used merely for the purpose of description, and shall not be construed as indicating or implying relative importance or implying a quantity of indicated technical features. Therefore, features defining “first” “second”, and “third” can explicitly or implicitly include at least one of the features. In the description of the present invention, unless otherwise explicitly and specifically defined, “a plurality of” means at least two, for example, two, three and the like. All directional indications (for example, up, down, left, right, front, back) in the embodiments of the present invention are only used for explaining relative position relationships, movement situations or the like between the various components in a specific posture (as shown in the accompanying drawings). If the specific posture changes, the directional indications change accordingly. In this embodiment of this application, the terms “include”, “have”, and any variant thereof are intended to cover a non-exclusive inclusion. For example, a process, method, system, product, or device that includes a series of steps or units is not limited to the listed steps or units; and instead, further optionally includes a step or unit that is not listed, or further optionally includes another step or component that is intrinsic to the process, method, product, or device.

“Embodiment” mentioned in the specification means that particular features, structures, or characteristics described with reference to the embodiment may be included in at least one embodiment of the present invention. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments.

This application is described in detail below with reference to the accompanying drawings and embodiments.

FIG. 1 is a schematic structural diagram of an electronic atomization device according to this application. In this embodiment, an electronic atomization device is provided. The electronic atomization device may be configured to atomize an aerosol-generating substrate. The electronic atomization device includes an atomizer 10 and a battery assembly 20 that are electrically connected to each other.

The atomizer 10 is configured to store the aerosol-generating substrate and atomize the aerosol-generating substrate to form an aerosol that can be inhaled by a user. The atomizer 10 may be specifically used in different fields such as medical treatment and electronic aerosolization devices. In a specific embodiment, the atomizer 10 may be used in the electronic aerosolization device for atomizing a to-be-atomized substrate and generating an aerosol for an inhaler to inhale, which is used as an example in the following embodiments. Certainly, in other embodiments, the atomizer 10 is applicable to a medical device for treating upper and lower respiratory system diseases to atomize medical drugs.

For the specific structure and function of the atomizer 10, reference may be made to the specific structure and function of the atomizer 10 in any of the following embodiments, and the same or similar technical effects can be achieved. Details are not described herein again.

The battery assembly 20 includes a battery and a controller. The battery is configured to supply power to the atomizer 10, so that the atomizer 10 can atomize the aerosol-generating substrate to form an aerosol; and the controller is configured to control the atomizer 10 to operate.

The atomizer 10 and the battery assembly 20 may be integrally arranged or detachably connected, and may be designed according to specific needs.

Figure 2:
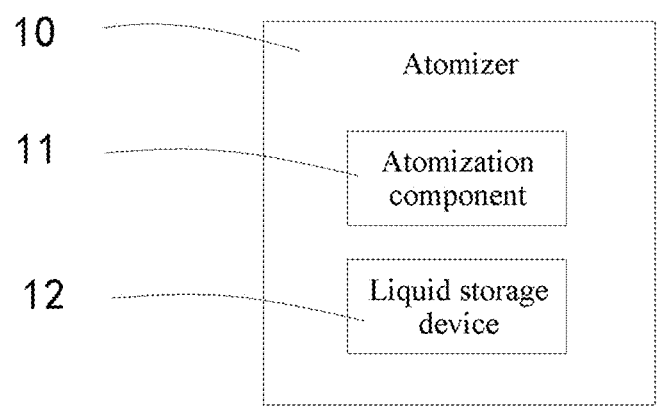
FIG. 2 is a schematic structural diagram of an atomizer according to this application.

FIG. 2 is a schematic structural diagram of an atomizer according to this application. In this embodiment, an atomizer 10 is provided. The atomizer 10 includes an atomization component 11 and a liquid storage device 12, the liquid storage device 12 is configured to store an aerosol-generating substrate, and the atomization component 11 is configured to heat and atomize the aerosol-generating substrate in the liquid storage device 12. For the specific structure and function of the atomization component 11, reference may be made to the specific structure and function of the atomization component 11 in any of the following embodiments, and the same or similar technical effects can be achieved. Details are not described herein again.

Figure 3:
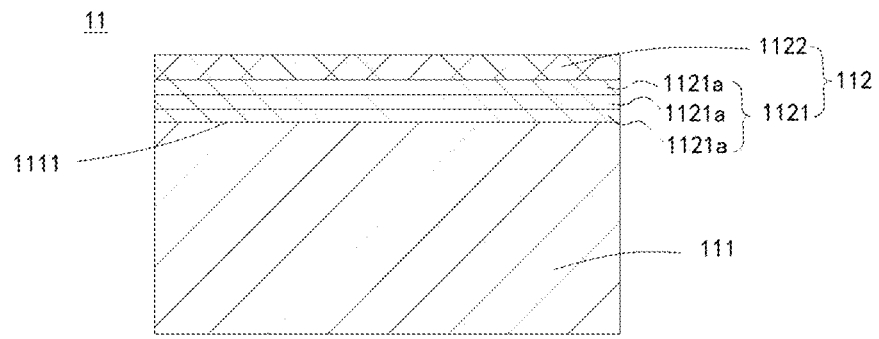
FIG. 3 is a schematic structural diagram of a first embodiment of an atomization component according to this application.

FIG. 3 is a schematic structural diagram of a first embodiment of an atomization component 11 according to this application. In this embodiment, an atomization component 11 is provided. The atomization component 11 includes a matrix 111 and a heating film 112. The matrix 111 includes an atomization surface 1111, and the heating film 112 is arranged on the atomization surface 1111, so that the heating film 112, when energized, heats the aerosol-generating substrate that is close to the atomization surface 1111 to form an aerosol.

Specifically, the matrix 111 may be a porous material, such as porous ceramic, porous glass, porous plastic, or porous metal. In this embodiment, the matrix 111 is made of a porous ceramic matrix. The porous ceramic has pores and has the functions of conducting liquid and storing liquid, so that the aerosol-generating substrate may permeate into the atomization surface 1111 in the matrix 111 to be heated and atomized. The porous ceramic has stable chemical properties and does not chemically react with the aerosol-generating substrate; and the porous ceramic is high-temperature resistant, and does not deform due to an excessive heating temperature. The porous ceramic is an insulator, which is not electrically connected to the heating film 112 formed thereon, so that a short circuit is avoided, and is easy to manufacture and low in cost. In an embodiment, a surface of the matrix 111 that is opposite to the atomization surface 1111 is provided with a liquid storage tank. The aerosol-generating substrate in the liquid storage device 12 first enters the liquid storage tank, and then permeates into the atomization surface 1111.

In some embodiments, the porosity of the porous ceramic may be 30% to 70%. The porosity is a ratio of a total volume of tiny gaps within a porous medium to a total volume of the porous medium. The value of the porosity may be adjusted according to components of the aerosol-generating substrate. For example, when the viscosity of the aerosol-generating substrate is relatively high, a greater porosity is selected to ensure the liquid-conducting effect.

In some other embodiments, the porosity of the porous ceramic is 50% to 60%. The porosity of the porous ceramic is 50% to 60%. On the one hand, it can be ensured that the porous ceramic has relatively high liquid-conducting efficiency to prevent the phenomenon of dry burning caused by poor circulation of the aerosol-generating substrate, so as to improve the atomization effect. On the other hand, it can be avoided that the porous ceramic conducts a liquid excessively fast, making it difficult to seal the liquid and resulting in a greatly increased probability of liquid leakage.

In some other embodiments, the atomization surface 1111 of a porous matrix 111 is further provided with a modification layer. Especially when the porous matrix 111 is made of the porous ceramic, the surface smoothness of the porous ceramic is extremely low, making it difficult for a metal heating layer 1121 to be deposited as a continuous and compact porous structure on a surface of the metal heating layer 1121. The modification layer can improve the surface flatness of the atomization surface 1111 of the porous matrix 111, so that the metal heating layer 1121 is deposited as a continuous and compact porous structure on the surface of the metal heating layer 1121. Preferably, a thickness of the modification layer is 50 μm to 300 μm. It may be understood that if the thickness of the modification layer is excessively small, the modification effect is poor; and an excessively thick modification layer covers a large quantity of pores of the porous matrix, reducing the thermal conductivity.

Further, the modification layer includes the following components in parts by mass: 56 to 67.5 parts of silicon dioxide, 12 to 18 parts of aluminum oxide, and 2.8 to 5.5 parts of lithium oxide. Preferably, the modification layer further includes 1.8 to 2.8 parts of phosphorus pentoxide, 0.5 to 2.0 parts of calcium oxide, 0.15 to 1.5 parts of magnesium oxide, and 2.5 to 5.25 parts of barium oxide. Further preferably, the modification layer further includes the following components in parts by mass: at least one of 0.1 to 5 parts of zirconium oxide or 0.3 to 0.45 parts of zinc oxide.

The heating film 112 includes an inorganic protection layer 1122 and the metal heating layer 1121. The metal heating layer 1121 is configured to generate heat when energized to heat and atomize the aerosol-generating substrate.

The metal heating layer 1121 is arranged on the matrix 111. In this embodiment, the metal heating layer 1121 is arranged on the atomization surface 1111 of the matrix 111. The metal heating layer 1121 includes a plurality of stacked sub-metal layers 1121a, and there may be two or more sub-metal layers 1121a. In this embodiment, there are three sub-metal layers 1121a. In the metal heating layer 1121, any two adjacent sub-metal layers 1121a have different components. That is, the metal heating layer 1121 is formed by sequentially stacking at least two sub-metal layers 1121a that have different components, and two adjacent sub-metal layers 1121a have different components. For example, when the metal heating layer 1121 is formed by stacking a sub-metal layer A and a sub-metal layer B that have different components and there are four sub-metal layers 1121a, the structure of the metal heating layer 1121 may be A-B-A-B or B-A-B-A. When the metal heating layer 1121 is formed by stacking a sub-metal layer A, a sub-metal layer B, and a sub-metal layer C that have different components and there are five sub-metal layers 1121a, the structure of the metal heating layer 1121 may be A-B-C-B-A, or A-B-C-A-B. Transition may be performed between the sub-metal layers 1121a with different components, and some sub-metal layers 1121a may be used as a transition to reduce a residual stress inside the metal heating layer 1121, so that the continuity of a film layer of the metal heating layer 1121 can be improved, cracks on a surface of the heating film 112 can be reduced, adhesion of the heating film 112 can be effectively improved, and the stability and service life of the atomization component 11 can be improved.

Further, the heating film 112 is a porous film. A porous structure on the heating film 112 can cause a liquid aerosol-generating substrate to permeate into the heating film 112 or a surface of the atomization surface 1111 more efficiently, so that the liquid-conducting efficiency and heat-conducting efficiency of the heating film 112 are improved, and the atomization effect of the atomization component 11 is improved. It may be understood that the inorganic protection layer 1122 and the metal heating layer 1121 included in the heating film 112 are also porous films. Specifically, in some embodiments, the inorganic protection layer 1122 and the metal heating layer 1121 are continuous porous structures. The metal heating layer 1121 may deposit a metal film on the porous matrix 111 by physical vapor deposition (Physical Vapor Deposition, PVD for short) or chemical vapor deposition (Chemical Vapor Deposition, CVD for short). In a film forming process, porous structures corresponding to pores on the porous matrix 111 are formed, and a continuous and compact metal film is formed on a solid portion between the pores. Therefore, the continuous porous structure mainly comes from a preparation process, and parameters such as a pore size and porosity on the heating film 112 may be adjusted by controlling parameters such as the porosity and pore size of the porous matrix 111 and the thickness of the metal film. Similarly, a porous structure of the inorganic protection layer 1122 also comes from the preparation process. In a sintering process of a raw material coating of the inorganic protection layer 1122, due to the fluidity, part of the material enters the pores of the porous matrix 111, and an other part of the material is continuously and compactly covered on the metal heating layer 1121 to form a continuous porous structure.

The inorganic protection layer 1122 is arranged on a surface of the metal heating layer 1121 that is away from the matrix 111. The inorganic protection layer 1122 is configured to protect the metal heating layer 1121. Specifically, the inorganic protection layer 1121 is arranged on a surface of the outermost sub-metal layer 1121*a* of the metal heating layer 1121 that is away from the matrix 111. The heating film 112 provided with only the metal heating layer 1121 is prone to corrosion by the aerosol-generating substrate or the atomized aerosol, causing the metal heating layer 1121 to fail and resulting in poor stability and shorter service life of the atomization component 11. The inventor finds that a resistance value of the heating film 112 can be reduced by adding the inorganic protection layer 1122, and in addition, an increase degree in the resistance value of the heating film 112 can also be significantly reduced during use; and it is proved that the stability of the heating film 112 during use is improved, so that the failure of the heating film 112 can be effectively prevented when the oil supply is insufficient, and the service life of the atomization component 11 is improved. For the implementation of the foregoing effects, after analysis, the inventor believes that when the inorganic protection layer 1122 is arranged on the surface of the metal heating layer 1121, the inorganic protection layer 1122 can prevent the aerosol-generating substrate or the atomized aerosol from coming into contact with the metal heating layer 1121, so that the corrosion on the metal heating layer 1121 by the aerosol-generating substrate or the atomized aerosol is greatly reduced, and the service life of the atomization component 11 is prolonged.

In this application, an internal stress of the metal heating layer 1121 is reduced by stacking a plurality of sub-metal layers 1121*a* as the metal heating layer 1121. On the one hand, the continuity of the film layer of the metal heating layer 1121 is improved, and the occurrence of cracks is avoided. On the other hand, the risk of crack failure generated by the heating film 112 under thermal shock is reduced. In addition, the inorganic protection layer 1122 is arranged on the surface of the metal heating layer 1121 that is away from the matrix 111 to protect the metal heating layer 1121, so that the corrosion resistance of the heating film 112 is further improved, and the service life of the heating film 112 is prolonged.

Compared with a solution in which a precious metal is used as a protection layer, the heating film 112 may include no precious metal material or the usage of the precious metal material in the heating film 112 may be reduced, so that the overall cost is low, and the cost of the atomization component 11 can be reduced. In addition, the heating film 112 is not prone to over-burning and agglomeration under the condition of insufficient oil supply or thermal shock, so that the metal heating layer 1121 is not prone to failure, the stability of the atomization component 11 is effectively improved, and the service life of the atomization component 11 is prolonged.

The material of the inorganic protection layer 1122 can be selected according to actual needs, and a sintering temperature is usually below 1000° C., for example, the material of the inorganic protection layer 1122 may be a ceramic material or a glass material. In some embodiments, when the inorganic protection layer 1122 is mainly made of a ceramic material, the inorganic protection layer 1122 mainly includes at least one component of $Al_2O_3$, $SiO_2$, MgO, BaO, CaO, $ZrO_2$ or ZnO; and in a sintering process, the components are presented in the inorganic protection layer 1122 in the form of corresponding silicates such as $Ca_2SiO_3$, $Mg_2SiO_3$, or other compound components. In some other embodiments, when the inorganic protection layer 1122 is mainly made of a glass material, the inorganic protection layer 1122 mainly includes at least one of $Na_2SiO_3$, $CasiO_3$, $SiO_2$, $Li_2O$ or $Na_2O{\cdot}CaO{\cdot}6SiO_2$.

In an embodiment, to ensure the continuity of liquid supply and avoid dry burning, the heating film 112 needs to have a particular wettability; and because specific atomization substrates have different types, the heating film 112 can be roughly categorized into a lipophilic heating film, a hydrophilic heating film, and a hydrophilic and lipophilic heating film. In this embodiment, surface features of the heating film 112 are mainly determined by the inorganic protection layer 1122; and therefore, the inorganic protection layer 1122 has lipophilicity and/or hydrophilicity. The lipophilicity and/or hydrophilicity can be modified by impregnating the raw material with different solvents or additives or changing process conditions to prepare the lipophilic and/or hydrophilic inorganic protection layer 1122. For example, a mixture of hydrogen-containing silicone oil, ethanol, and sodium acetate can be selected as a modified solution, and a ceramic raw material is impregnated at a room temperature and be heated and dried at about 100° C. to prepare a lipophilic ceramic raw material. The inventor further finds through research that when the inorganic protection layer 1122 is prepared by sintering the raw material of the inorganic protection layer 1122 at 400° C. to 650° C., the inorganic protection layer 1122 shows good wettability to the liquid atomized substrate, that is, lipophilicity and hydrophilicity. Main components of the liquid atomized substrate include: propylene glycol (PG), glycerol (vegetable glycerin/VG), essence, and the like.

A thickness of the inorganic protection layer 1122 may range from 0.1 μm to 5 μm. For example, the thickness of the inorganic protection layer 1122 may be 0.1 μm, 1 μm, 2 μm, 3 μm, 4 μm, 5 μm, or the like. An excessively thin inorganic protection layer 1122 provides inadequate protection for the metal heating layer 1121. An excessively thick inorganic protection layer 1122 may cover the matrix 111 and the porous structure of the metal heating layer 1121 in the preparation process, making it difficult for the heating film 112 to form a continuous porous grid structure and reducing the liquid-conducting efficiency and heat-conducting efficiency of the heating film 112. When a range of the thickness of the inorganic protection layer 1122 is set within a range from 0.1 μm to 5 μm, the inorganic protection layer 1122 can effectively protect the metal heating layer 1121, and a continuous porous grid structure can be formed in the heating film 112, so that the liquid-conducting efficiency and heat-conducting efficiency of the heating film 112 are better.

Figure 4:
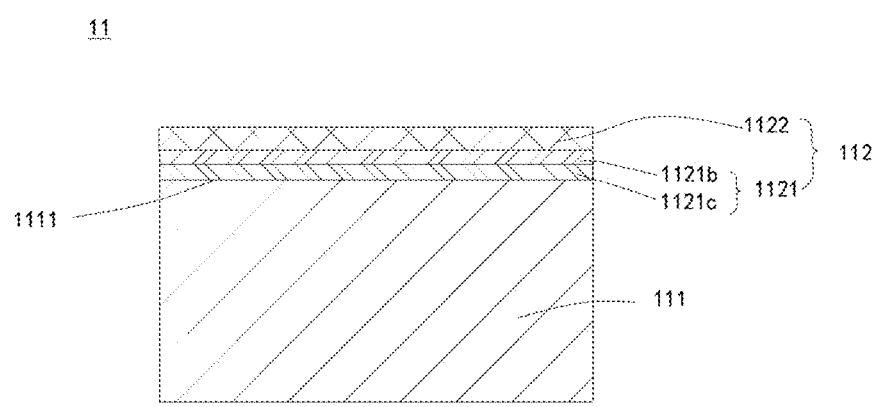
FIG. 4 is a schematic structural diagram of a second embodiment of an atomization component according to this application.
Figure 5:
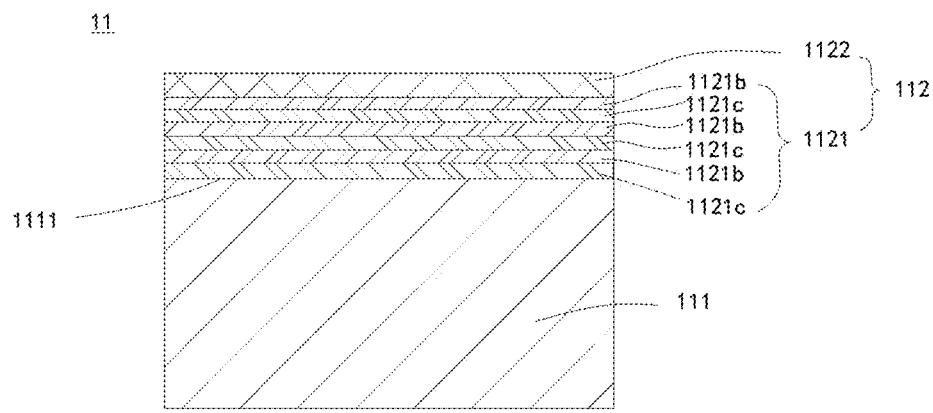
FIG. 5 is a schematic structural diagram of a third embodiment of an atomization component according to this application.

FIG. 4 is a schematic structural diagram of a second embodiment of an atomization component 11 according to this application. FIG. 5 is a schematic structural diagram of a third embodiment of an atomization component 11 according to this application.

The metal heating layer 1121 includes a first sub-metal layer 1121b and a second sub-metal layer 1121c. The first sub-metal layer 1121b serves as a heating layer of the metal heating layer 1121 to generate heat. The first sub-metal layer 1121b may be made of a metal or alloy material with good continuity, good oxidation resistance, and corrosion resistance, for example, NiCr alloy or 316L stainless steel. The NiCr alloy has high resistivity and good thermal stability; and 316L stainless steel has excellent corrosion resistance and high temperature resistance due to the addition of an Mo element.

The second sub-metal layer 1121c may be arranged between the lowermost first sub-metal layer 1121b and the matrix 111 (as shown in FIG. 4), and come into contact with the atomization surface 1111 to serve as a transition layer between the matrix 111 and the lowermost first sub-metal layer 1121b; or when there are a plurality of first sub-metal layers 1121b, the second sub-metal layer 1121c may be arranged between adjacent first sub-metal layers 1121b (as shown in FIG. 5) as a transition layer between the plurality of first sub-metal layers 1121b. In an embodiment, the second sub-metal layer 1121c is arranged between the matrix 111 and the lowermost first sub-metal layer 1121b and between the adjacent first sub-metal layers 1121b. The second sub-metal layer 1121b may be made of TiZr alloy (titanium zirconium alloy).

Figure 6:
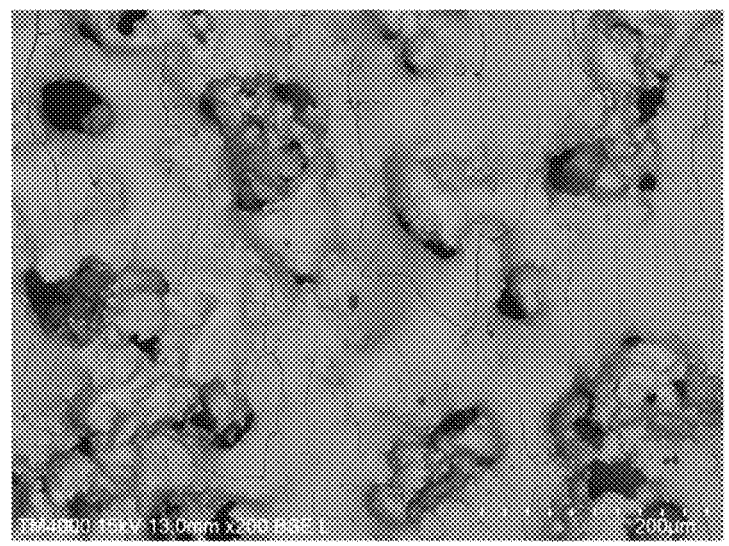
FIG. 6 is a scanning electron micrograph of a heating film prepared by directly arranging a NiCr alloy or 316L stainless steel metal layer on a matrix.

FIG. 6 is a scanning electron micrograph of a heating film 112 that is prepared by only arranging the first sub-metal layer 1121b (being made of NiCr alloy or 316L stainless steel) on the matrix 111. It can be seen from FIG. 6, only the heating film 112 of the first sub-metal layer 1121b is arranged. Because a NiCr film and 316L stainless steel film have good continuity, there is a great residual stress on a surface of the NiCr film. After sintering, a large quantity of cracks exist on the surface of the heating film 112, and adhesion of a film layer is poor. As a result, the film layer severely falls off, so that the stability and service life of the heating film 112 are severely affected. The second sub-metal layer 1121c is arranged as a transition layer between the plurality of first sub-metal layers 1121b or a transition layer between the first sub-metal layer 1121b and the matrix 111, so that a residual stress on the surface of the first sub-metal layer 1121b can be effectively reduced, cracks on the surface of the heating film 112 are reduced, a situation in which the film layer falls off is effectively improved, and the stability and service life of the atomization component 11 are improved.

Referring to FIG. 4 and FIG. 5, in an embodiment, the first sub-metal layer 1121b and the second sub-metal layer 1121c are alternately distributed between the atomization surface 1111 and the inorganic protection layer 1122. The second sub-metal layer 1121c can come into contact with the atomization surface 1111, or the first sub-metal layer 1121b can come into contact with the atomization surface 1111; and the quantity of the first sub-metal layers 1121b and the quantity of the second sub-metal layers 1121c may be the same or different.

Preferably, the quantity of the first sub-metal layers 1121b and the quantity of the second sub-metal layers 1121c are the same, the second sub-metal layer 1121c comes into contact with the atomization surface 1111, and the outermost sub-metal layer is the first sub-metal layer 1121b. For example, referring to FIG. 4, in the embodiment in FIG. 4, there is one first sub-metal layer 1121b and one second sub-metal layer 1121c, and the second sub-metal layer 1121c comes into contact with the atomization surface 1111. Referring to FIG. 5, there are three first sub-metal layers 1121b and three second sub-metal layers 1121c, and one second sub-metal layers 1121c comes into contact with the atomization surface 1111. The second sub-metal layer 1121c is arranged in contact with the surface of the matrix 111, so that a situation in which the surface of the heating film 112 has many cracks and the heating film 112 tends to fall off can be effectively improved. In a layered structure in which the first sub-metal layer 1121b and the second sub-metal layer 1121c are alternately arranged, the quantity of the first sub-metal layers 1121b and the quantity of the second sub-metal layers 1121c are the same. The second sub-metal layer 1121c comes into contact with the atomization surface 1111, and the outermost sub-metal layer is the first sub-metal layer 1121b. The first sub-metal layer 1121b is on the uppermost layer, so that the metal layer 1121 can be prevented from failing when the oil supply is insufficient or the liquid oil is semi-dry.

Further, in the structure in which the first sub-metal layer 1121b and the second sub-metal layer 1121c are alternately arranged, there may be a total of two to ten layers. For example, as shown in FIG. 4, in the second embodiment, there are a total of two layers, there is one first sub-metal layer 1121b, there is one second sub-metal layer 1121c, and the second sub-metal layer 1121c is arranged between the first sub-metal layer 1121b and the matrix 111.

There may be at least two first sub-metal layers 1121b and at least two second sub-metal layers 1121c. As shown in FIG. 5, in the third embodiment, the layered structure in which the first sub-metal layer 1121b and the second sub-metal layer 1121c are alternately arranged has a total of six layers. There are three first sub-metal layers 1121b and three second sub-metal layers 1121c, and the three first sub-metal layers 1121b and the three second sub-metal layers 1121c are alternately stacked. Preferably, the three second sub-metal layers 1121c are all made of TiZr, and the first sub-metal layers 1121b are all made of 316L or NiCr. Then, a layered structure of the second sub-metal layer 1121c and a layered structure of the first sub-metal layer 1121b may be TiZr-316L-TiZr-316L-TiZr-316L or TiZr—NiCr—TiZr—NiCr—TiZr—NiCr. When a quantity of layers in the layered structure in which the first sub-metal layer 1121b and the second sub-metal layer 1121c are alternately arranged is small, under the condition that a total resistance of the heating film 112 is kept unchanged, a total thickness of the heating film 112 remains unchanged, and a thickness of the single metal layer 1121 increases. Metal particles accumulate a lot of stress in a single layer deposition process, resulting in more cracks on the heating film 112. When the layered structure in which the first sub-metal layer 1121b and the second sub-metal layer 1121c are alternately arranged has a total of six layers, the thickness of the single metal layer 1121 is relatively moderate, the formed heating film 112 has fewer cracks and has stronger thermal shock resistance, and the service life of the atomization component 11 is longer.

Figure 7:
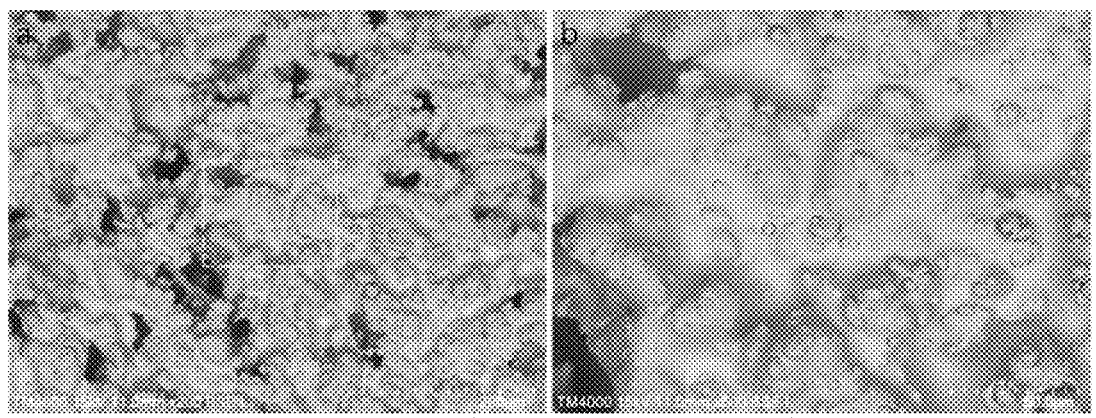
FIG. 7 is a scanning electron micrograph of an embodiment of an atomization component according to this application.

It may be understood that when there are at least two first sub-metal layers 1121b and at least two second sub-metal layers 1121c, a total thickness of the first sub-metal layers 1121b may be 1 μm to 20 μm, for example, may be 1 μm, 5 μm, 10 μm, 15 μm, 20 μm, or the like. A total thickness of the second sub-metal layers 1121c may be 0.5 μm to 5 μm, for example, may be 0.5 μm, 1 μm, 2 μm, 3 μm, 4 μm, or 5 μm. The total thickness is a sum of all the sub-metal layers in the same thicknesses, and a thickness of a single sub-metal layer may be adjusted according to actual needs. The thickness of the single sub-metal layer and the total thickness are usually adjusted considering a need of a resistance value of the heating film 112. For example, in an embodiment, the layered structure of the metal heating layer 1121 has a total of six layers; and There are three first sub-metal layers 1121b and three second sub-metal layers 1121c, the total thickness of the first sub-metal layers 1121b is 6 μm, and the total thickness of the second sub-metal layers 1121c is 3 μm. Single sub-metal layers may have the same thickness or different thicknesses. In this embodiment, the single sub-metal layers have the same thickness. The thicknesses of the single first sub-metal layers 1121b are all 2 μm, and the thicknesses of the single second sub-metal layers 1121c are all 1 μm. In some other embodiments, the thicknesses of the single sub-metal layers may be partially the same or completely different. For example, in a direction from the matrix 111 to the inorganic protection layer 1122, the thicknesses of the second sub-metal layers 1121c are sequentially 0.5 μm, 2 μm, and 0.5 μm, and the total thickness is 3 μm; and the thicknesses of the first sub-metal layers 1121b are sequentially 1 μm, 2 μm, and 3 μm, and the total thickness is 6 μm. It may be understood that, in a preferred implementation, the metal heating layer 1121 comes into contact with the matrix 111 through the second sub-metal layer 1121c. The second sub-metal layer 1121c serves as a transition layer, and consequently the thickness of the second sub-metal layer 1121c that comes into contact with the inorganic protection layer 1122 or the porous matrix 111 may be less than the thickness of an other second sub-metal layer 1121c, so that the continuity and compactness of the heating film 112 are improved, cracks are reduced, failure under thermal shock is avoided, and the service life of the atomization component 11 is prolonged. FIG. 7 is a scanning electron micrograph of an embodiment according to this application. In FIG. 7a, the surface of the heating film 112 is continuous and compact and has a specific amount of pore distribution, and the heating film 112 is presented as a continuous porous structure as a whole. FIG. 7b is a partial enlarged view of FIG. 7a. Compared with a contrast example in FIG. 6, the heating film 112 is continuous and compact, has no cracks, and completely covers a non-porous region of the matrix.

Figure 8:
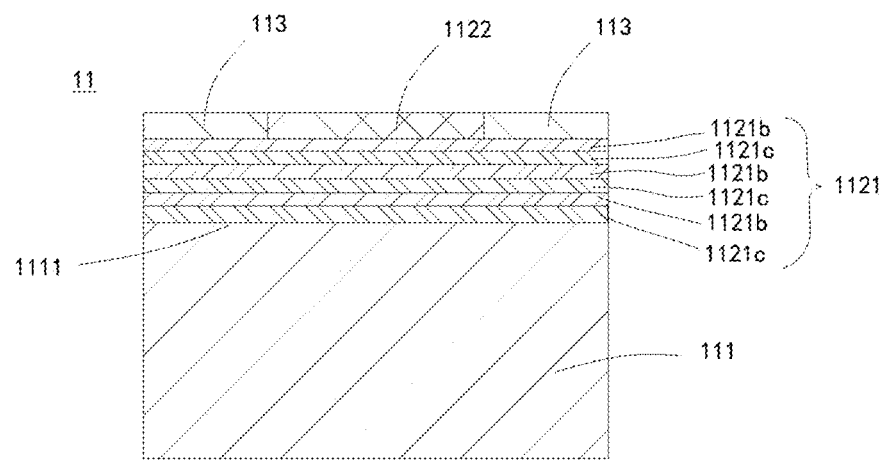
FIG. 8 is a schematic structural diagram of a fourth embodiment of an atomization component according to this application.
Figure 9:
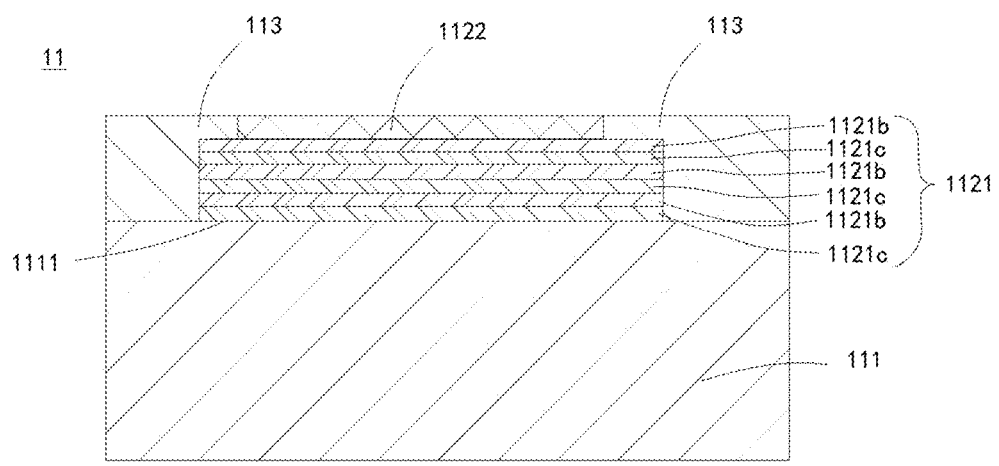
FIG. 9 is a schematic structural diagram of a fifth embodiment of an atomization component according to this application.

FIG. 8 and FIG. 9 are respectively schematic structural diagrams of a fourth embodiment and a fifth embodiment of an atomization component 11 according to this application.

The atomization component 11 further includes two electrodes 113 respectively arranged on two opposite sides of the metal heating layer 1121 and electrically connected to the metal heating layer 1121. The inorganic protection layer 1122 covers a portion of the uppermost sub-metal layer 1121a that is located between the two electrodes 113. The two electrodes 113 are separately electrically connected to positive and negative lead wires, so that the metal heating layer 1121 between the two electrodes 113 can conduct a current to generate heat. The two electrodes 113 may be partially or both arranged on a side of the uppermost sub-metal layer 1121a that is away from the matrix 111. In a fourth embodiment, as shown in FIG. 8, the two electrodes 113 may be both arranged on a part of a surface of the uppermost sub-metal layer 1121a that is away from the matrix 111, and are spaced apart at two opposite ends of the uppermost sub-metal layer 1121a. The inorganic protection layer 1122 covers an other part of the surface of the uppermost sub-metal layer 1121a that is away from the matrix 111. In a fifth embodiment, as shown in FIG. 9, the metal heating layer 1121 is arranged on a part of the atomization surface 1111 of the matrix 111, and a part of the two electrodes 113 is arranged on the uppermost sub-metal layer 1121a. An other part of the two electrodes 113 is arranged on an other part of the atomization surface 1111 of the matrix 111, and the inorganic protection layer 1122 covers a portion of the uppermost sub-metal layer 1121a between the two electrodes 113. The material of the two electrodes 113 may be selected from metal materials with good conductivity such as gold and silver. In consideration of both the cost and the case of preparation, silver is preferred.

Figure 10:
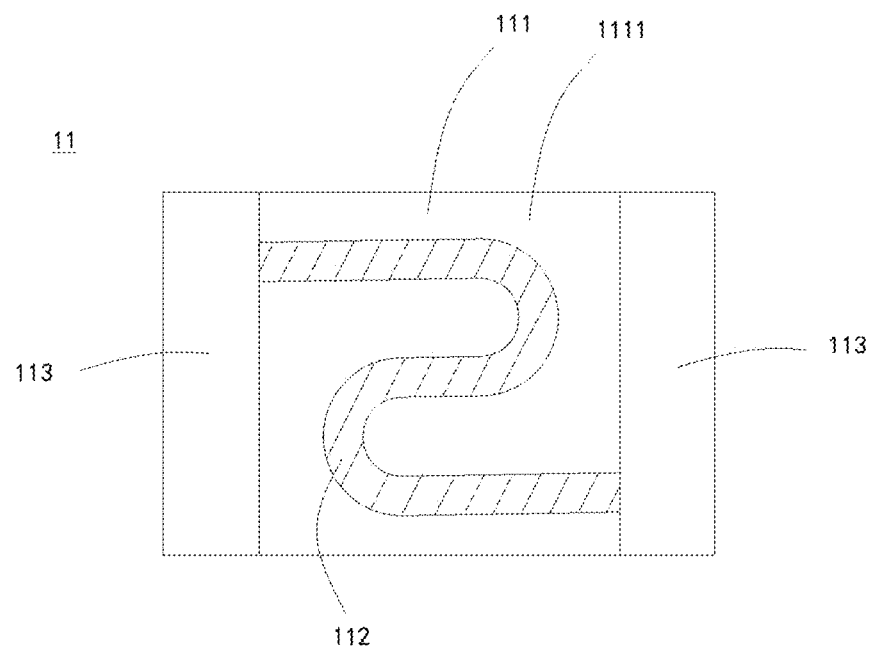
FIG. 10 is a schematic structural diagram of a sixth embodiment of an atomization component according to this application.
Figure 11:
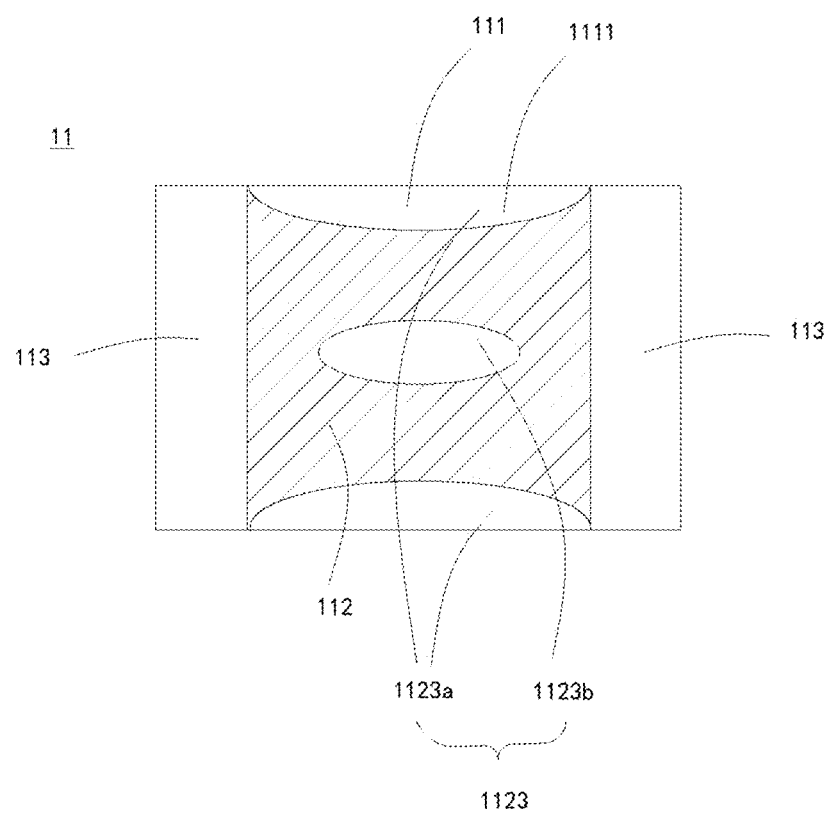
FIG. 11 is a schematic structural diagram of a seventh embodiment of an atomization component according to this application.
Figure 12:
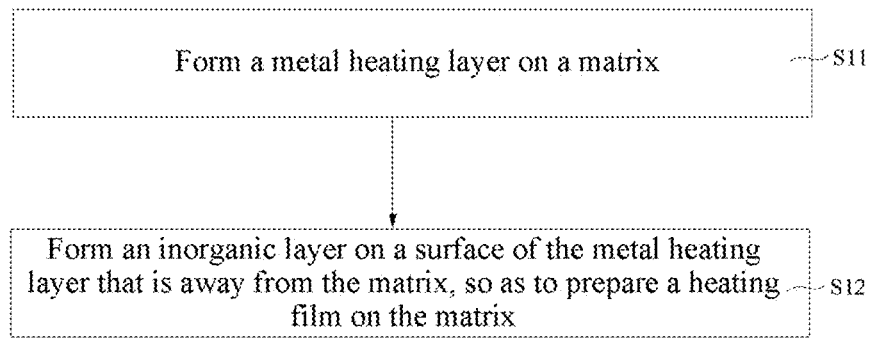
FIG. 12 is a flowchart of a preparation method for an atomization component according to a first embodiment of this application.
Figure 13:
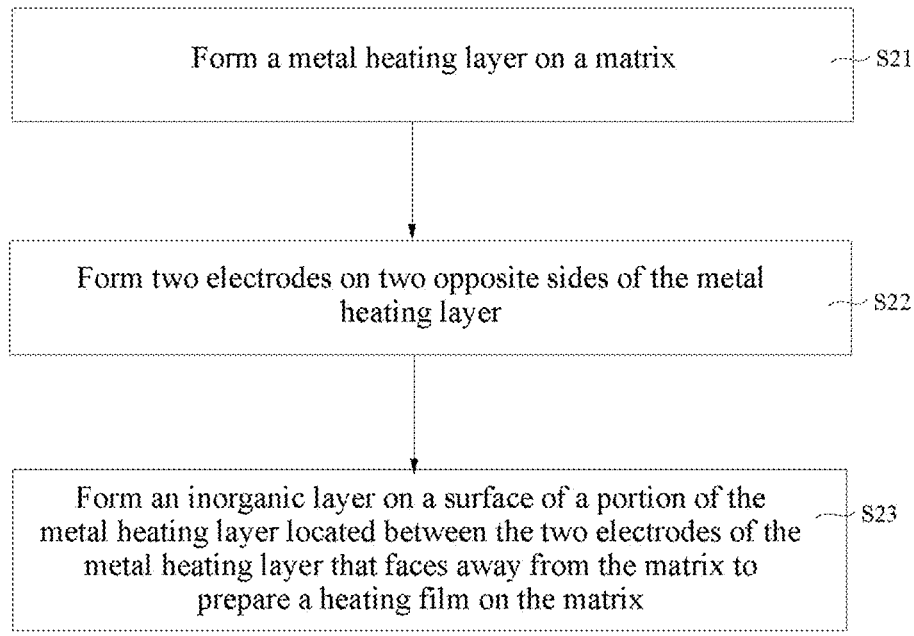
FIG. 13 is a flowchart of a preparation method for an atomization component according to a second embodiment of this application.

FIG. 10 is a top view of a sixth embodiment of an atomization component 11 according to this application. FIG. 11 is a top view of a seventh embodiment of an atomization component 11 according to this application. A shaded part is the heating film 112 of the atomization component 11 or the metal heating layer 1121. In this embodiment, a shape of the heating film 112 or the metal heating layer 1121 is a preset shape, and the shape may be a regular shape such as an S shape, a circle, an ellipse, a semicircle, or a ring. For example, in the embodiment in FIG. 10, the shape of the heating film 112 is an S shape. The two electrodes 113 are respectively connected to two ends of the S-shaped heating film 112.

The shape of the heating film 112 may be an irregular pattern. For example, in the embodiment in FIG. 11, the shape of the heating film 112 is an irregular pattern. The heating film 112 may be a regular pattern, and one or more hollowed-out portions 1123 are provided on the regular pattern. For example, in the embodiment in FIG. 11, the shape of the heating film 112 is a rectangle, and the hollowed-out portion 1123 that does not generate heat is provided in the rectangular heating film. The hollowed-out portion 1123 includes a first hollowed-out portion 1123*a* and a second hollowed-out portion 1123*b*. There are two first hollowed-out portions 1123*a*, the two electrodes 113 are symmetrically arranged on two opposite sides of the rectangle, and the first hollowed-out portions 1123*a* are located in the other opposite sides of the rectangle. The shape of the first hollowed-out portion 1123*a* is a sector; and the second hollowed-out portion 1123*b* is provided in the middle of the two first hollowed-out portions 1123*a* and is located in the middle of the heating film 112, and the second hollowed-out portion 1123*b* is an ellipse. In other embodiments, the shape of the heating film 112 may be a square, a triangle, a circle, a semicircle, or the like, and the shapes of the first hollowed-out portion 1123*a* and the second hollowed-out portion 1123*b* may be circles, triangles, rectangles, squares, or the like. There may be one or more first hollowed-out portions 1123*a* and second hollowed-out portions 1123*b*. In a case that the heating film 112 is not patterned, when the heating film 112 is atomizing the aerosol-generating substrate, a highest temperature is between 210° C. and 230° C. so that the generated aerosol is difficult to evaporate fragrance, a sense of stimulation is weak, and the taste is poor. When the heating film 112 is patterned, the heating film 112 can construct a better heating temperature gradient according to the shape of the heating film 112, a surface power density is increased, and a high temperature region of the heating film 112 is increased. The aerosol generated through atomization by the heating film 112 has stronger sweetness and fragrance, and a strong sense of stimulation, so that the taste of the aerosol can be effectively improved.

FIG. 12 is a flowchart of a preparation method for an atomization component according to a first embodiment of this application.

In this embodiment, a preparation method for the atomization component includes the following steps: Step S11. Form a metal heating layer on the matrix.

The matrix 111 may be a porous ceramic matrix. The metal heating layer 1121 is formed by at least two sub-metal layers 1121*a* that are sequentially stacked, and any two adjacent sub-metal layers 1121*a* have different components. That is, the metal heating layer 1121 is formed by sequentially stacked at least two sub-metal layers 1121*a* with different components, and two adjacent sub-metal layers 1121*a* have different components. Transition may be performed between the sub-metal layers 1121*a* with different components, and some sub-metal layers 1121*a* may be used as a transition to reduce a residual stress inside the metal heating layer 1121, so that the continuity of a film layer of the metal heating layer 1121 can be improved, cracks on a surface of the heating film 112 can be reduced, adhesion of the heating film 112 can be effectively improved, and the stability and service life of the atomization component 11 can be improved.

In a specific implementation process, raw materials used to form the at least two sub-metal layers 1121*a* of the metal heating layer 1121 may be separately made into a plurality of target materials. Then, a magnetron sputtering process is used to sputter the plurality of target materials on the atomization surface 1111 of the matrix 111 repeatedly to form the metal heating layer 1121. The metal heating layer 1121 is formed on the surface of the matrix 111 by magnetron sputtering. The metal heating layer 1121 has high purity, good adhesion, a uniform thickness of a film, and good process repeatability.

Step S12. Form an inorganic protection layer on a surface of the metal heating layer that is away from the matrix, so as to prepare a heating film on the matrix.

Specifically, the inorganic protection layer 1122 is configured to protect the metal heating layer 1121. The material of the inorganic protection layer 1122 may be at least one of a ceramic material or a glass material. In some embodiments, when the inorganic protection layer 1122 is a ceramic material, the inorganic protection layer 1122 mainly includes at least one component of $Al_2O_3$, $SiO_2$, $Ca_2SiO_3$, and $Mg_2SiO_3$. In some other embodiments, when the inorganic protection layer 1122 is made of a glass material, the inorganic protection layer 1122 mainly includes $Na_2SiO_3$, $CasiO_3$, $SiO_2$, $Li_2O$, and $Na_2O{\cdot}CaO{\cdot}6SiO_2$.

After the prepared filter material of the inorganic protection layer 1122 is dried, the inorganic protection layer 1122 is formed on a surface of the metal heating layer 1121 that faces away from the matrix 111 by using a spraying process or a magnetron sputtering process to prepare the heating film 112 on the matrix 111. When the spraying process is used in the filter material of the inorganic protection layer 1122, the surface of the metal heating layer 1121 that faces away from the matrix 111 is sprayed repeatedly in small amounts. In an embodiment, an intermediate with spraying being completed can be dried in an oven at 80° C. for 15 min, and the dried intermediate can be sintered at a temperature of 600° C. and then cooled to prepare the heating film 112.

In a preparation method for the atomization component, an internal stress of the metal heating layer 1121 is reduced by arranging the sub-metal layers 1121*a* that are stacked in a plurality of layers as the metal heating layer 1121; and on the one hand, the continuity of the film layer of the metal heating layer 1121 is improved, and the occurrence of cracks is avoided. On the other hand, the risk of crack failure generated by the heating film 112 under thermal shock is reduced. In addition, the inorganic protection layer 1122 is arranged on the surface of the metal heating layer 1121 that is away from the matrix 111 to protect the metal heating layer 1121, so that the corrosion resistance of the heating film 112 is further improved, and the service life of the heating film 112 is prolonged. Compared with a solution in which a precious metal is used as a protection layer, the heating film 112 does not include a precious metal material or the usage of the precious metal material in the heating film 112 is reduced, so that the overall cost is low, and the cost of the atomization component 11 can be reduced. In addition, the heating film 112 is not prone to over-burning and agglomeration under the condition of insufficient oil supply or thermal shock, so that the metal heating layer 1121 is not prone to failure, the stability of the atomization component 11 is effectively improved, and the service life of the atomization component 11 is prolonged.

FIG. 13 is a flowchart of a preparation method for an atomization component according to a second embodiment of this application. In this embodiment, a preparation method for the atomization component includes the following steps.

Step S21. Form a metal heating layer on the matrix.

Specifically, a specific implementation process of step S21 is the same as or similar to a specific implementation process of step S21 in the foregoing embodiment corresponding to FIG. 11, and the same or similar technical effects can be achieved. For details, reference may be made to the above, and details are not repeated herein.

Step S22. Form two electrodes on two opposite sides of the metal heating layer.

Specifically, the two electrodes 113 may be formed on the opposite sides of the metal heating layer 1121 by a screen printing process, and an intermediate with the screen printing process being performed is placed in an oven to be dried at 80° C. for 30 min.

Step S23. Form an inorganic protection layer on a surface of a portion of the metal heating layer located between the two electrodes of the metal heating layer that faces away from the matrix to prepare a heating film on the matrix.

Specifically, after the two electrodes 113 are masked with a mask plate, and the inorganic protection layer 1122 is formed by spraying or magnetron sputtering on the surface of a portion of the metal heating layer 1121 that is located between the two electrodes 113.

In the second embodiment, the two electrodes 113 are formed on two opposite sides of the metal heating layer 1121, and the two electrodes 113 can be connected to external lead wires, so that after the two electrodes 113 are energized, the metal heating layer 1121 between the two electrodes 113 can be energized to generate heat.

FIG. 14 is a flowchart of a preparation method for an atomization component according to a third embodiment of this application. In this embodiment, a preparation method for the atomization component includes the following steps.

Step S31. Sequentially and alternately form a first sub-metal layer and a second sub-metal layer on an atomization surface of a matrix by magnetron sputtering according to a preset quantity of layers.

Specifically, the preset quantity of layers is a sum of the quantity of the first sub-metal layers 1121b and the quantity of the second sub-metal layers 1121c. The first sub-metal layer 1121b and the second sub-metal layer 1121c are alternately stacked between the atomization surface 1111 and the inorganic protection layer 1122 according to a preset quantity of layers. The second sub-metal layer 1121c may be arranged to come into contact with the atomization surface 1111, or the first sub-metal layer 1121b may come into contact with the atomization surface 1111; and the quantity of the second sub-metal layers 1121c and the quantity of the first sub-metal layers 1121b may be the same or different. Preferably, the quantity of the second sub-metal layers 1121c and the quantity of the first sub-metal layers 1121b are the same, and the second sub-metal layers 1121c come into contact with the atomization surface 1111.

Specifically, the material of the first sub-metal layer 1121b may be NiCr alloy or 316L stainless steel. In an implementation, parameters of the magnetron sputtering process of the first sub-metal layer 1121b may be that a sputtering power is 3500 W, a sputtering time is 80 min, a sputtering pressure is 0.5 Pa, and a sputtering temperature is in a range of a room temperature to 200° C. When the raw material of the first sub-metal layer 1121b is NiCr, parameters of the magnetron sputtering process of the NiCr are that a sputtering power is 3500 W, a sputtering time is 60 min, a sputtering pressure is 0.5 Pa, and a sputtering temperature is 200° C. When the raw material of the first sub-metal layer 1121b is 316L stainless steel, parameters of the magnetron sputtering process of 316L stainless steel are that a sputtering power is 3000 W, a sputtering time is 80 min, a sputtering pressure is 0.5 Pa, and a sputtering temperature is 200° C.

The second sub-metal layer 1121c may be made of TiZr alloy. When the material of the second sub-metal layer 1121b is TiZr alloy, in an implementation, parameters of the magnetron sputtering process for forming the second sub-metal layer 1121b are that a vacuum degree is $3.0*10-3$ Pa, a sputtering power is 2500 W, a sputtering time is 30 min, a sputtering pressure is 0.5 Pa, a sputtering temperature is 200° C., and a sputtering particle size is 200 nm to 400 nm.

Step S32. Form an inorganic protection layer on a surface of a metal heating layer that faces away from the matrix to prepare a heating film on the matrix.

Specifically, a specific implementation process of step S32 is the same as or similar to a specific implementation process of step S12 in the foregoing embodiment corresponding to FIG. 11, and the same or similar technical effects can be achieved. For details, reference may be made to the above, and details are not repeated herein.

In the third embodiment, the second sub-metal layer 1121c is arranged, so that a residual stress on the surface of the first sub-metal layer 1121b can be effectively reduced, cracks on the surface of the heating film 112 can be reduced, and the stability and service life of the atomization component 11 can be improved.

FIG. 15 is a flowchart of a preparation method for an atomization component according to a fourth embodiment of this application. In this embodiment, a preparation method for the atomization component includes the following steps.

Step S41. Form a metal heating layer on a matrix.

Step S42. Form an inorganic protection layer on a surface of the metal heating layer that faces away from the matrix to prepare a heating film on the matrix.

Specifically, specific implementation processes of step S41 and step S42 are the same as or similar to specific implementation processes of step S11 and step S12 in the foregoing embodiment corresponding to FIG. 11, and the same or similar technical effects can be achieved. For details, reference may be made to the above, and details are not repeated herein.

Step S43. Perform patterning processing on the heating film according to a preset pattern.

The preset pattern of the heating film 112 may be an S shape, a circle, an ellipse, a semicircle, or a ring. As shown in FIG. 10, the preset pattern of the heating film 112 shown in FIG. 10 is an S shape. The preset pattern of the heating film 112 may be an irregular pattern, for example, an irregular pattern as shown in a shaded part in FIG. 11. Specifically, the hollowed-out portion 1123 of the heating film 112 may be cut off through an etching process, so that a shape of the heating film 112 is a preset pattern. For example, in the embodiment in FIG. 11, the rectangular heating film 112 prepared in step S42 is subjected to an etching process to remove the first hollowed-out portion 1123a and the second hollowed-out portion 1123b, so that the irregular heating film in FIG. 11 is prepared.

In the fourth embodiment, when the heating film 112 is patterned, the heating film 112 can construct a better heating temperature gradient according to the shape of the heating film 112, a surface power density is increased, and a high temperature region of the heating film 112 is increased. The aerosol generated through atomization by the heating film 112 has stronger sweetness and fragrance, and a strong sense of stimulation, so that the taste of the aerosol can be effectively improved.

The foregoing descriptions are merely embodiments of this application, and the protection scope of this application is not limited thereto. All equivalent structure or process changes made according to the content of this specification and accompanying drawings in this application or by directly or indirectly applying this application in other related technical fields shall fall within the protection scope of this application.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An atomization component, comprising:
a matrix; and
a heating film,
wherein the matrix comprises an atomization surface,
wherein the heating film is arranged on the atomization surface, and when energized, is configured to heat and atomize an aerosol-generating substrate on the atomization surface,
wherein the heating film comprises a metal heating layer and an inorganic protection layer that are stacked, the inorganic protection layer being arranged on a surface of the metal heating layer that is away from the matrix,
wherein the metal heating layer comprises at least two sub-metal layers that are sequentially stacked,
wherein any two adjacent sub-metal layers have different components,
wherein the metal heating layer comprises a first sub-metal layer and a second sub-metal layer that are stacked, and
wherein the first sub-metal layer comprises NiCr or 316L stainless steel, and the second sub-metal layer comprises TiZr.

2. The atomization component of claim 1, wherein the matrix comprises a porous matrix, or wherein the metal heating layer and/or the inorganic protection layer comprise porous structures.

3. The atomization component of claim 1, wherein the inorganic protection layer comprises at least one of a ceramic material or a glass material.

4. The atomization component of claim 3, wherein the inorganic protection layer has lipophilicity and/or hydrophilicity.

5. The atomization component of claim 1, wherein the metal heating layer comes into contact with the matrix through the second sub-metal layer.

6. The atomization component of claim 1, wherein there are at least two first sub-metal layers and at least two second sub-metal layers.

7. The atomization component of claim 1, wherein a total thickness of the first sub-metal layer is 1 µm to 20 µm, a total thickness of the second sub-metal layer is 0.5 µm to 5 µm, and a thickness of the inorganic protection layer is 0.1 µm to 5 µm.

8. The atomization component of claim 1, wherein a shape of the heating film or the metal heating layer is an S shape, a circle, an ellipse, a semicircle, or a ring.

9. The atomization component of claim 1, further comprising:
two electrodes, respectively arranged on two opposite sides of the metal heating layer and electrically connected to the metal heating layer,
wherein the inorganic protection layer covers a portion of the metal heating layer that is located between the two electrodes.

10. The atomization component of claim 9, the heating film comprises a rectangle,
wherein the two electrodes are arranged on two opposite sides of the rectangle, and
wherein a hollowed-out portion that does not generate heat is provided in the rectangular heating film.

11. The atomization component of claim 10, wherein the hollowed-out portion comprises a first hollowed-out portion and a second hollowed-out portion, the first hollowed-out portion being located in other opposite sides of the rectangle, and the first hollowed-out portion being a sector, and
wherein the second hollowed-out portion is located in a middle of the heating film, the second hollowed-out portion being an ellipse or a circle.

12. The atomization component of claim 2, wherein the atomization surface of the porous matrix comprises a modification layer, and
wherein a thickness of the modification layer is 50 µm to 300 µm.

13. The atomization component of claim 12, wherein the modification layer comprises in parts by mass: 56 to 67.5 parts of silicon dioxide, 12 to 18 parts of aluminum oxide, and 2.8 to 5.5 parts of lithium oxide.

14. An atomizer, comprising:
a liquid storage device; and
the atomization component of claim 1,
wherein the liquid storage device is configured to store an aerosol-generating substrate.

15. An electronic atomization device, comprising:
a battery assembly; and
the atomizer of claim 14,
wherein the battery assembly is configured to supply power to the atomizer.

16. An atomization component, comprising:
a matrix; and
a heating film,
wherein the matrix comprises an atomization surface,
wherein the heating film is arranged on the atomization surface, and when energized, is configured to heat and atomize an aerosol-generating substrate on the atomization surface,
wherein the heating film comprises a metal heating layer and an inorganic protection layer that are stacked, the inorganic protection layer being arranged on a surface of the metal heating layer that is away from the matrix,
wherein the metal heating layer comprises at least two sub-metal layers that are sequentially stacked,
wherein any two adjacent sub-metal layers have different components, wherein the matrix comprises a porous matrix, or wherein the metal heating layer and/or the inorganic protection layer comprise porous structures, wherein the atomization surface of the porous matrix comprises a modification layer, and wherein a thickness of the modification layer is 50 μm to 300 μm.

17. The atomization component of claim 16, wherein the modification layer comprises in parts by mass: 56 to 67.5 parts of silicon dioxide, 12 to 18 parts of aluminum oxide, and 2.8 to 5.5 parts of lithium oxide.

* * * * *